United States Patent [19]

Herbert

[11] Patent Number: 5,104,050

[45] Date of Patent: Apr. 14, 1992

[54] FOOD PROCESSOR HAVING AXIALLY TRANSLATABLE BLADE SPINDLE COUPLED FOR ROTATION TO MOTOR DRIVEN SHAFT

[75] Inventor: William B. Herbert, Pine Bush, N.Y.

[73] Assignee: HR&D, Inc., Clifton, N.J.

[21] Appl. No.: 586,110

[22] Filed: Sep. 21, 1990

[51] Int. Cl.⁵ .......................................... B02C 19/08
[52] U.S. Cl. ............... 241/37.5; 241/199.11; 241/199.12; 241/282.2
[58] Field of Search ............... 241/37.5, 100, 169.1, 241/169.2, 199.11, 199.12, 282.1, 282.2, 283, 199.3, 199.8; 310/77

[56] References Cited

U.S. PATENT DOCUMENTS

| | | |
|---|---|---|
| 554,021 | 2/1896 | Farnoff . |
| 845,584 | 2/1907 | Schwenck ............... 241/199.11 |
| 1,610,322 | 12/1926 | Reich . |
| 2,795,382 | 6/1957 | Francesch . |
| 2,815,056 | 12/1957 | Gimelli . |
| 3,130,927 | 4/1964 | Schmieding . |
| 4,113,188 | 9/1978 | Behnkoff ............... 241/37.5 |
| 4,117,980 | 10/1978 | Hartmann ............... 241/37.5 |
| 4,184,641 | 1/1980 | Coggiola ............... 241/37.5 |
| 4,203,555 | 5/1980 | Dickson, Jr. ............... 241/100 X |
| 4,373,677 | 2/1983 | Kunihiro ............... 241/37.5 |
| 4,512,522 | 4/1985 | Williams ............... 241/37.5 |
| 4,547,076 | 10/1985 | Mauren ............... 241/283 X |
| 4,629,131 | 12/1986 | Podell ............... 241/37.5 X |

Primary Examiner—Mark Rosenbaum
Assistant Examiner—Frances Chin
Attorney, Agent, or Firm—Lowe, Price, LeBlanc & Becker

[57] ABSTRACT

A food processor includes a motor driven shaft having a central bore in which a blade spindle is located. The blade spindle is axially translatable relative to the shaft. The spindle and shaft are coupled together so that the spindle rotates with the shaft. The blade spindle and a blade assembly connected thereto are mounted on a lid or the like that fits on an upper edge of a conventional receptacle, formed basically as a jar. Nooks and crannies usually associated with food processor bowls are eliminated to facilitate cleaning of the jar and lid.

20 Claims, 2 Drawing Sheets

FOOD PROCESSOR HAVING AXIALLY TRANSLATABLE BLADE SPINDLE COUPLED FOR ROTATION TO MOTOR DRIVEN SHAFT

FIELD OF INVENTION

The present invention relates generally to food choppers known as food processors and more particularly to a food processor including a motor driven shaft having a central bore for receiving an axially translatable blade spindle that rotates with the shaft.

BACKGROUND ART

Food processors are extensively employed for domestic and food service purposes. A typical prior art food processor includes a base in which an electric motor is located. The motor includes a shaft that extends upwardly through the base through a bottom face of a specially designed bowl. A blade assembly, including a cutter head, plural blades and a shaft which fits over the motor shaft and is splined thereto, is located in the bowl such that, in one arrangement, the blades are always close to the bottom of the bowl while the shaft is turning, but in a second arrangement, the blades are always close to the top of the bowl while they are turning. Food items to be cut or diced are placed in the bowl through an opening in a lid or cover of the bowl, or the bowl cover is selectively removed to enable the food product to be placed in or removed from the bowl. Usually, an elaborate mechanical arrangement is included to assure that the user of the food processor cannot insert her or his body parts into the bowl while the motor is driving the blades. This switch arrangement is necessary because the food to be cut or diced may be inserted through the opening in the cover while the blades are being driven at very high speed by the motor.

Because of the elaborate mechanical arrangement for aligning the bowl, cover and housing to prevent ingress of user body parts into the bowl while the blades are turning and food is being inserted into the cover, the prior art food processor bowls and/or covers include many projections, resulting in nooks and crannies that are frequently difficult to clean and from which food is not readily removed. Another disadvantage of the prior art food processor containers is that they cannot be used in a refrigerator or a cooking cavity, such as a microwave oven.

It is, accordingly, an object of the present invention to provide a new and improved food processor which is relatively easy to clean since it employs bowls or receptacles having conventional jar-like shapes.

BRIEF DESCRIPTION OF THE INVENTION

In accordance with the present invention, a new and improved food processor includes a motor driven shaft having a central bore in which a blade spindle is located. The blade spindle is axially translatable relative to the shaft. The spindle and shaft are coupled together so that the spindle rotates with the shaft. The blade motor with hollow spindle and a blade assembly connected thereto are mounted on a lid or the like that fits on to an upper edge of a conventional receptacle, formed basically as a jar. The nooks and crannies usually associated with prior art food processor bowls are thereby eliminated to facilitate cleaning of the jar and lid. The motor for driving the shaft is of the "braked" type so that it stops turning almost immediately after power is removed from it to prevent damage to user body parts when the blade assembly is removed from the bowl.

In accordance with one embodiment, the shaft is driven directly by a motor and, in fact, is the motor shaft. In this embodiment, the motor is fixedly attached to a rim that bears downwardly against the upper edge of the receptacle. The blade assembly is axially driven against the bias of a compression spring located between a top face of the motor and the bottom of a knob having a thrust bearing for carrying the spring. In this embodiment the motors as manufactured include an axially extending bore.

I have devised a second embodiment of the invention wherein a conventional or stock motor drives a shaft having a center bore for receiving the blade spindle. The motor drives the bored drive shaft through a pulley and belt arrangement located in a spindle head including a pair of parallel plates between which the pulley and belt arrangement is located. The motor and blade assemblies are located on opposite sides of a somewhat centrally located post extending through the spindle head. The post is mounted on a base for receiving the bowl. The spindle head includes a thrust bearing sleeve which fits over the post and is attached to a counterbalancing spring for providing an upwardly directed force tending to neutralize the weight of the spindle head.

As a safety feature, the motor can be activated only when the spindle head is correctly in place. To this end, first and second normally open switches are respectively located on the base and on the spindle head. The switch on the base is closed in response to the motor being in position, while the switch on the spindle head is closed in response to the spindle head being in proper position on the food containing bowl. These two switches are connected in series with each other or to a manually activated control switch for the motor to provide the desired result.

The above and still further objects, features and advantages of the present invention will become apparent upon consideration of the following detailed description of several specific embodiments thereof, especially when taken in conjunction with the accompanying drawings.

DETAILED DESCRIPTION OF THE PREFERRED EMBODIMENTS

Figure 1:
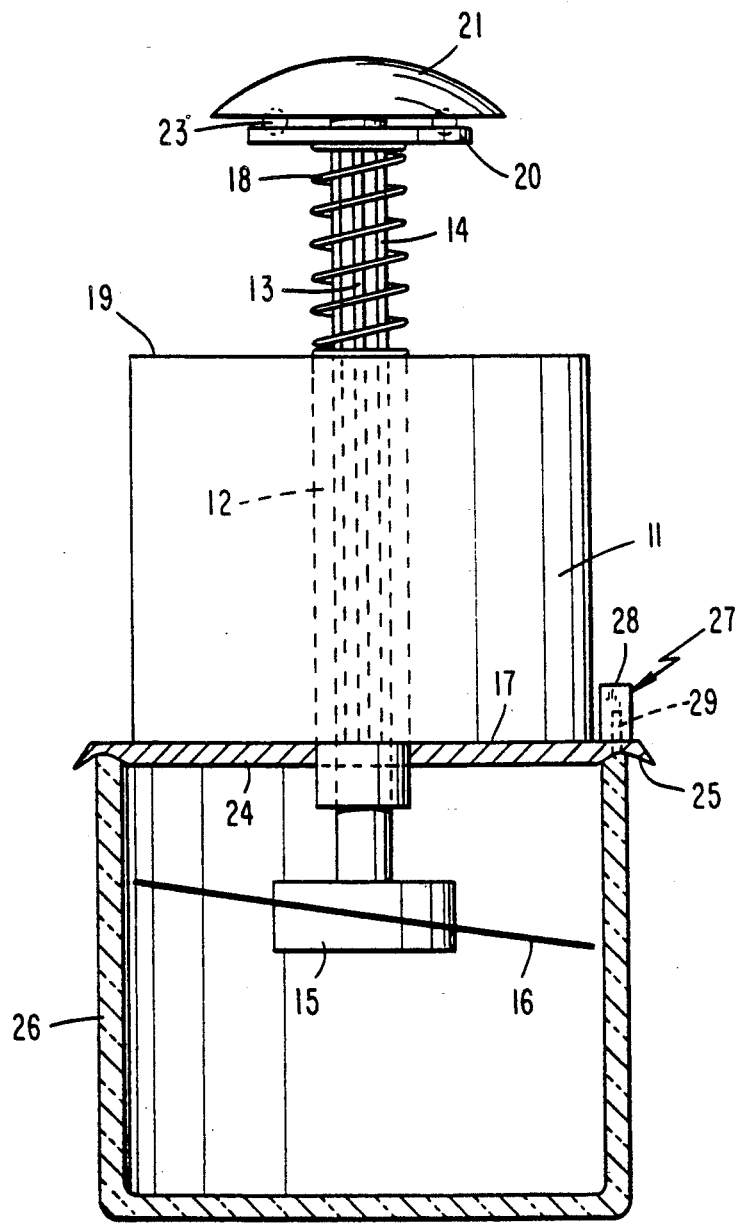
FIG. 1 is a side view, partly in section, of a first embodiment of the invention.

Reference is now made to FIG. 1 of the drawing wherein motor 11 includes output shaft 12 having an axial, i.e., longitudinal, centrally located bore in which are located longitudinally extending grooves for receiving splines 13 on spindle 14. This arrangement enables spindle 14 to rotate with shaft 12, while providing axial movement of the spindle relative to the shaft. To prevent injury to the user shaft 12 of motor 11 is electrically braked when power is removed from the shaft, such that the shaft does not turn more than two or three revolutions after power removal.

Mounted at one end of spindle 14 is a blade assembly including cutter head 15 on which are fixedly mounted cutting blades 16. Cutter head 15 is normally located a predetermined distance, as illustrated, away from end face 17 of motor housing 11. To this end, compression spring 18 extends between and is captured in grooves in upper planar face 19 of motor housing 11 and flat plate 20, fixedly connected to manually activated knob 21. Plate 20 and knob 21 are fixedly attached to spindle 14 by thrust bearing 23. Spring 18 is located in a compressible housing (not shown) which moves up and down with movement of knob 21.

Fixedly attached to end face 17 of motor 11 is disc shaped plate 24 having circular groove 25, located in proximity to the circumference of the plate. Plate 24, with its groove 25, functions as a lid for jar shaped container 26 in which the food to be chopped is placed. The geometry of groove 25 and of the upper edge of jar 26 are such that the upper edge fits into the groove while the lid is in place.

To prevent motor 11 from being activated except when lid 24 is in place on jar 26, normally open position sensing switch 27 includes push rod 29 that is spring biased in the downward position. Push rod 29 normally extends through groove 25 so it contacts the upper edge of jar 26 when lid 24 is in place on the jar top edge. Switch 27 includes housing 28, having a slot for enabling push rod 29 to engage the top peripheral edge of jar 26. Housing 28 is constructed such that ingress by a human body part into the housing to reach push rod 29 is very difficult, if not impossible. Push rod 29 actuates a normally open contact that translates with the push rod to engage a stationary contact in housing 28. The contacts of switch 27 are connected in series with a manually activated operating switch (not shown) for motor 11. Thereby, motor 11 can be energized only when the operating switch is closed and the contacts of switch 27 are closed in response to lid 24 being correctly in position on jar 26.

In operation, food to be diced or cut is loaded into jar 26 with lid 24 and the parts connected thereto removed from the jar. Lid 24 is then placed on the jar so that groove 25 of the lid engages the upper, peripheral edge of the jar, causing the contacts of switch 27 to be closed. The user then activates the operating switch so that power is applied to motor 11. Thereby, shaft 12 and spindle 14 turn together at the same speed to drive cutter head 15 and blade 16. Initially, spring 18 causes blade 16 to be positioned in jar 26, in proximity to the top of the jar. Usually this initial position of blade 16 is above the food in jar 26.

The user then pushes down on knob 21, causing spindle 14 and blade 16 to translate axially of shaft 12 and jar 26 until the blade contacts the food closest to the top of jar 26. The blade continues to be driven by shaft 12 and motor 11 to cut the food at the top of jar 26. The user then presses knob 21 down farther and the operation continues until knob 21 is pushed all the way down, at which time the lowest portion of blade 16, which is canted at an angle of approximately 15° to the horizontal plane, i.e., displaced approximately 75° from the axis of spindle 14, is slightly above the bottom, interior face of jar 26, as controlled by the maximum compression of spring 18 between face 19 and plate 20. Knob 21 is then released so that the bias of spring 18 forces plate 20 upwardly, back to its initial position. This causes spindle 14, cutter head 15 and blade 16 to return to the initial position thereof, as illustrated.

Figure 2:
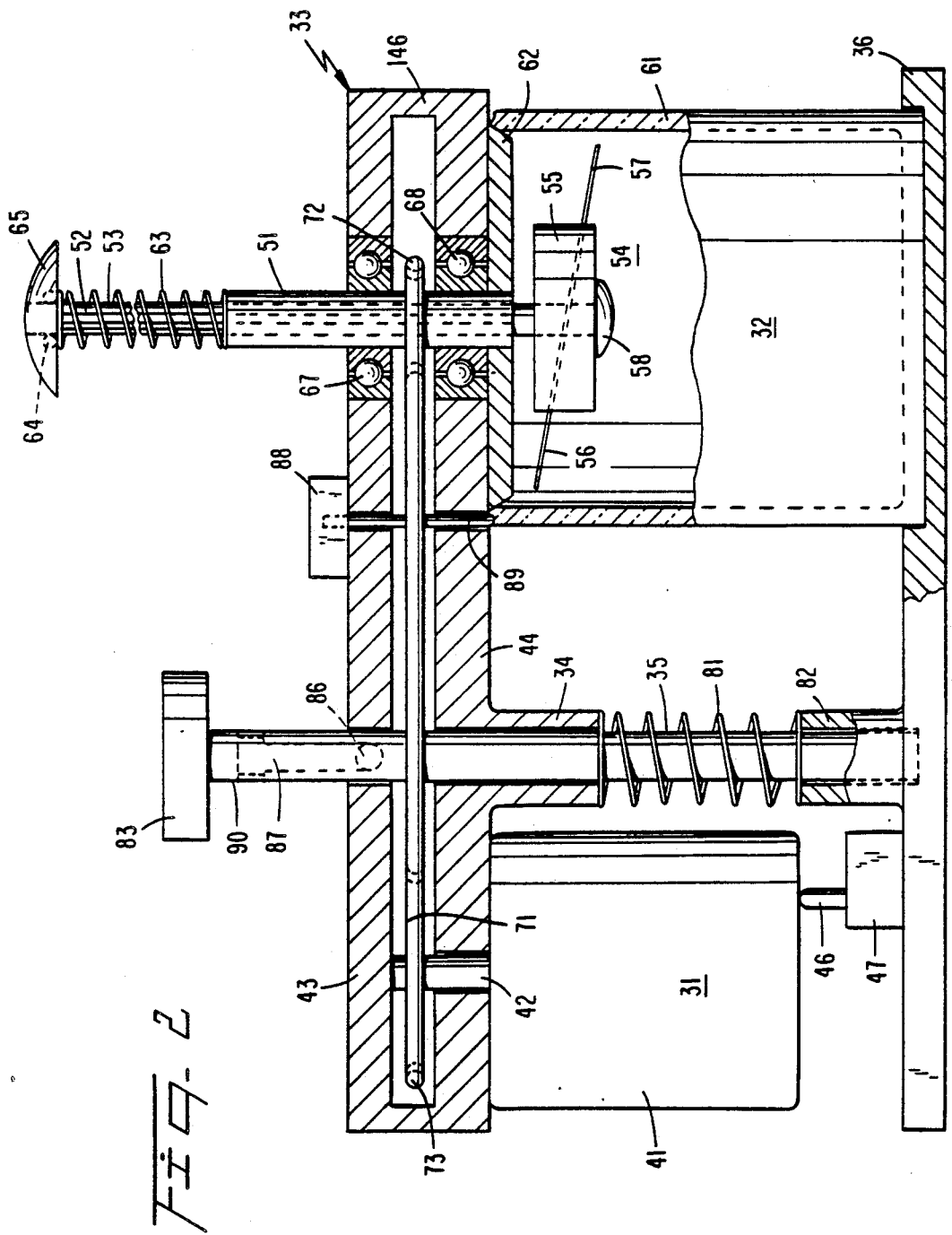
FIG. 2 is a side view, partly in section, of a second embodiment of the invention.

A second preferred embodiment of the invention, illustrated in FIG. 2, obviates the need for a motor having a special, center bored shaft. The embodiment of FIG. 2 includes motor subassembly 31 and cutter subassembly 32, located on opposite sides of the entire food processor assembly. Subassemblies 31 and 32 are carried by spindle head 33, including a belt and pulley arrangement for connecting the two subassemblies together in driving relation so the motor of subassembly 31 drives the cutter of subassembly 32. Spindle head 33 also includes downwardly extending thrust bearing sleeve 34 through which post 35 extends. Post 35 is fixedly mounted on base 36.

Motor subassembly 31 includes electrically braked motor 41 and output shaft 42. Shaft 42 is captured in a bearing (not shown) in upper plate 43 of spindle head 33. Shaft 42 extends through an opening in bottom plate 44 of spindle head 33. Plates 43 and 44 of spindle head 33 are connected together by web 146, extending around the periphery of the spindle head. Plates 43 and 44, as well as web 146, are an integral, one piece unit formed, for example, of molded plastic. The upper face of the housing of motor 41 is fixedly secured to the lower horizontally extending planar face of bottom plate 44. When spindle head 33 is correctly positioned on post 35, the bottom, planar face of the housing for motor 41 engages upwardly directed, spring biased pin 46 of normally open switch 47, fixedly mounted on the upper face of base 36. The force exerted by the housing of motor 41 against pin 46 causes the pin to be driven downwardly, to close the normally open contacts of switch 47 when spindle head 33 and motor 41 are correctly positioned.

Cutter subassembly 32 includes shaft 51 having a central axially extending bore including axially extending slots for receiving spines 52 on spindle 53 so that the spindle rotates with the shaft, while providing axial movement of the spindle relative to the shaft. At one end of spindle 53 is fixedly mounted a blade assembly including cutting head 55. Head 55 carries radially extending blades 56 and 57 which are canted approximately 15° to the horizontal plane, i.e., approximately 75° from the axis of shaft 51 and spindle 53. Head 55 is fixedly secured to the end of spindle 53 by any suitable arrangement, such as by mating threads in the spindle and head. To prevent excessive downward motion of head 55, projection 58 extends from the bottom face thereof and is secured to spindle 53.

In normal initial position, head 55 is located in proximity to the bottom face of plate 44. With spindle head 33 in correct initial position relative to base 36, blades 56 and 57 are in proximity to the upper edge of jar 61, having no projections or nooks or crannies so that it is easy to clean. Jar 61, in operation, fits into a circular cutout on the top face of base 36. The center of the circular cutout is aligned with the axis of shaft 51 and spindle 53 when spindle head 33 is correctly in place.

To assist in correctly positioning spindle head 33 relative to jar 61, the spindle head is molded to include downwardly extending boss 62 having a tapered sidewall that fits snugly with the interior upper wall portion of jar 61 to form effectively the lid of the jar. Boss 62 includes a bore for receiving shaft 51 and spindle 53.

Blade assembly 54 is selectively driven down in response to manual force from the user while shaft 51 and spindle 53 are being driven by motor shaft 42 via the belt and pulley arrangement. To maintain blade assembly 54 in the normal illustrated initial position while providing the downward force, compression spring 63 is connected between and captured by an upper shoulder of shaft 51 and lower planar face of knob 65, including thrust bearing 64.

Shaft 51 is held vertically in place relative to spindle head 33 by bearings 67 and 68, respectively located in upper plate 43 and lower plate 44 of the spindle head.

Shaft 51 is driven by motor shaft 42 by a belt and pulley arrangement located between plates 43 and 44 and spindle head 33. Shaft 42 is fixedly connected to pulley 71, while shaft 51 is fixedly connected to pulley 72. Pulleys 71 and 72 are connected together by belt 73 so that rotation of shaft 42 in response to activation of motor 41 results in turning of pulley 71, belt 73, pulley 72 and shaft 51. Shaft 51, in turn, drives spindle 53.

As indicated sucra, post 35 on base 36 cooperates with thrust bearing sleeve 34 to assist in maintaining spindle head 33 in place. The subassembly associated with post 35 further includes counterbalancing spring 81, extending between the bottom face of sleeve 34 and the upper face of cylindrical abutment 82, in turn extending upwardly from base 36, to which it is secured. Spring 81 provides an upward force against head 33 tending to neutralize the weight of the head. Spring 81 is connected to the bottom face of sleeve 34 on spindle head 33 and bears against the top face of abutment 82 when the spindle head is correctly in position.

Post 35 includes, at the upper end thereof, collar 83 which limits the upward travel of spindle head 33. To enable spindle head 33 to be turned relative to post 35, to facilitate placement of the spindle head in the correct position relative to jar 61, plate 43 includes in a side interior wall thereof, horizontally extending pin 86 that engages groove 87 in post 35. Groove 87 extends toward collar 83 to annular groove 90 which permits spindle head 33 to turn in a horizontal plane about post 35 and to be properly located radially while spindle head 33 is in lowered position. Hence, pin 86 and groove 87 enable spindle head 33 to turn about post 35 when cutter assembly 54 has been raised sufficiently to clear bowl 61, but locate spindle head 33 radially when the spindle head is in the lowered position where boss 62 enters the top of bowl 61.

Proper placement of spindle head 33 relative to jar 61 is sensed by normally open switch 88, including downwardly extending, spring biased position sensing pin 89. Pin 89 presses against the top peripheral edge of jar 61 when spindle head 33 is correctly positioned on the bowl. Switch 88 includes normally open contacts connected in series with the normally open contacts of switch 47, in turn connected in series with an activating switch (not shown) for motor 31. In response to spindle head 33 being correctly positioned so that pins 46 and 89 respectively engage the bottom end face of the housing for motor 41 and the top peripheral edge of jar 61 and the operating switch for motor 31 being activated, the motor drives shaft 42, which in turn drives shaft 51 through the belt and pulley arrangement including pulleys 71 and 72 and belt 73. Splined spindle 53 is thereby rotated, to drive cutter head 54. Prior to motor 31 being activated, food is loaded into jar 61.

Initially, the cutter head 54 is above the food in jar 61. When the operator presses down on knob 65 and drives rotating cutter head 54 down, the cutting head 54 engages material in container 61 until blade 57 comes into proximity to the bottom interior face of jar 61. Knob 65 is then released and the tension of spring 63 drives spindle 53 upwardly relative to shaft 51. Spindle head 33 is then turned on post 35 to remove blade assembly 54 from jar 61. Jar 61 is then removed from the circular cutout in base 36 and the contents thereof are removed. The jar is easily cleaned and reused or placed into an oven or refrigerator/freezer with contents.

While there have been described and illustrated several specific embodiments of the invention, it will be clear that variations in the details of the embodiments specifically illustrated and described may be made without departing from the true spirit and scope of the invention as defined in the appended claims. For example, structures other than splined shafts and grooves can be used to provide a rotary connection between the drive shaft for the spindle carrying the blade assembly, while permitting the blade assembly to be moved axially relative to the drive shaft.

What is claimed is:

1. A food processor comprising a motor, a spindle carrying a blade, a shaft coupled in driven relation to the motor, the shaft including an axially extending bore, the spindle being located in the bore and coupled with the shaft so the spindle turns with the shaft and is axially translatable relative thereto, a food container having a mouth, a lid for the food container mouth, the spindle being positioned by the shaft and lid, the blade and spindle being dimensioned, positioned and arranged so that while the lid is in place on the mouth (a) the spindle and blade are located in the container, (b) the blade is turned in the container by the spindle, (c) the blade is axially translatable in the container, and (d) the blade is turned by the shaft and motor independently of the blade being axially translated by the spindle relative to the shaft.

2. The food processor of claim 1 wherein the shaft is the motor shaft, the motor shaft having a fixed vertical position relative to the lid.

3. The food processor of claim 2 wherein the motor is an electric motor and the lid carries the motor.

4. The food processor of claim 1 wherein the motor is an electric motor including a shaft different from the shaft including the axially extending bore, and means for connecting the motor shaft and the shaft including the axially extending bore in driving relation.

5. The food processor of claim 4 wherein the lid is on a structure carrying the motor and the means for connecting.

6. The food processor of claim 5 further including a base having a vertically extending centrally located post, the structure being removably mounted on said post, the structure when mounted on the post being arranged so that the motor shaft and the shaft including the axially extending bore are located on opposite sides of the post.

7. The food processor of claim 6 wherein the structure includes a counterbalancing spring exerting an upward force on the structure tending to neutralize the weight of the structure.

8. The food processor of claim 6 wherein the base includes a predetermined region for receiving the container, and means for enabling the motor to be activated in response to the structure being correctly in place so (a) the lid is on the container while the container is in the predetermined region and (b) the motor is at a predetermined position relative to the base for enabling the motor to be activated.

9. The food processor of claim 8 wherein the means for enabling includes first and second normally open switch contacts for respectively sensing (i) the lid being on the container while the container is in the predetermined region and (ii) the motor being at the predetermined position relative to the base, the first and second normally open switch contacts being respectively closed in response to (i) and (ii) being sensed, the normally open contacts being in series with each other.

10. The food processor of claim 4 further including means, including a manually activated handle, for applying a manual force to the spindle to axially translate the blade from a first predetermined position proximate the lid to a second predetermined position proximate a floor of the container, the motor being an electric motor.

11. The food processor of claim 10 further including means for normally biasing the blade to the first predetermined position.

12. The food processor of claim 1 further including means, including a manually activated handle, for applying a manual force to the spindle to axially translate the blade from a first predetermined position proximate the lid to a second predetermined position proximate a floor of the container, the motor being an electric motor.

13. The food processor of claim 12 further including means for normally biasing the blade to the first predetermined position.

14. The food process of claim 1 further including means responsive to the lid being correctly in place on the container for enabling the motor to be activated.

15. The food processor of claim 14 further including means, including a manually activated handle, for applying a manual force to the spindle to axially translate the blade from a first predetermined position proximate the lid to a second predetermined position proximate a floor of the container, the motor being an electric motor.

16. The food processor of claim 15 further including means for normally biasing the blade to the first predetermined position.

17. The food processor of claim 14 wherein the means for enabling includes normally open switch contacts for sensing the lid being correctly on the container, the normally open contacts being closed in response to the lid being correctly in place on the container, the normally open contacts being in series with an actuator switch for the motor.

18. The food processor of claim 1 wherein the shaft has a fixed longitudinal position relative to the lid.

19. The food processor of claim 1 wherein the container has an interior wall consisting of a cylinder and plain interior bottom face so that the interior of the container does not include nooks and crannies.

20. A food processor comprising a motor, a blade, a spindle carrying the blade, a shaft coupled in driven relation to the motor, the shaft including an axially extending bore, the spindle being located in the bore and coupled with the shaft so the spindle turns with the shaft and is axially translatable relative thereto, a food container having a mouth, a lid for the food container mouth, the spindle being positioned by the shaft and lid, the blade and spindle being dimensioned, positioned and arranged so that while the lid is in place on the mouth (a) the spindle and blade are located in the container, (b) the blade is turned in the container by the spindle, (c) the blade is axially translatable in he container relative to the lid in response to the spindle being translated longitudinally relative to the shaft and lid, and (d) the blade is turned by the shaft and motor independently of the blade being axially translated by the spindle relative to the shaft.

* * * * *